Dec. 11, 1956   L. GRUMMAN   2,773,699
TRAILER REAR WHEEL TORSION SPRING SUSPENSION
Filed Jan. 17, 1949   2 Sheets-Sheet 1
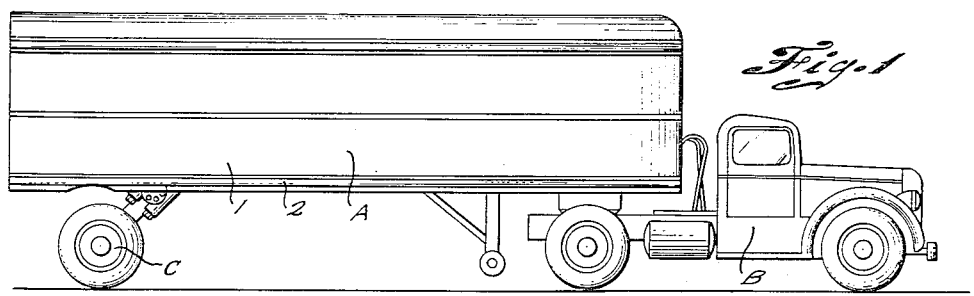
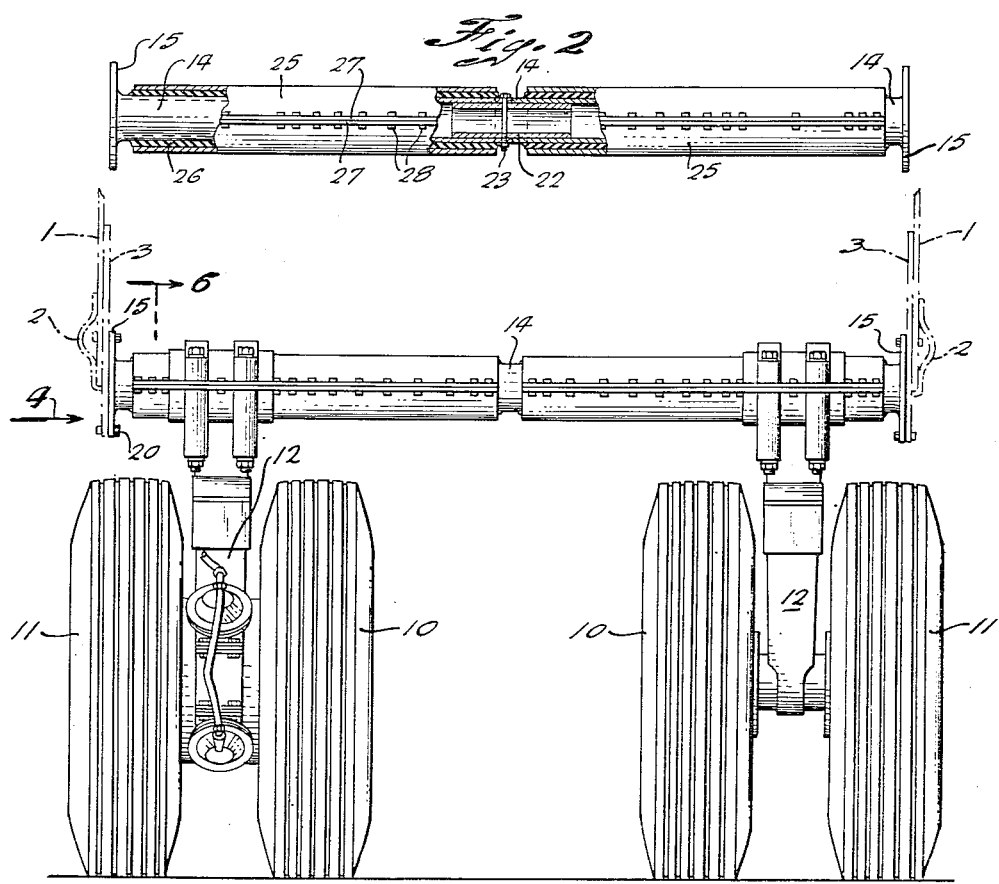
INVENTOR.
LE ROY GRUMMAN
BY
ATTORNEYS.

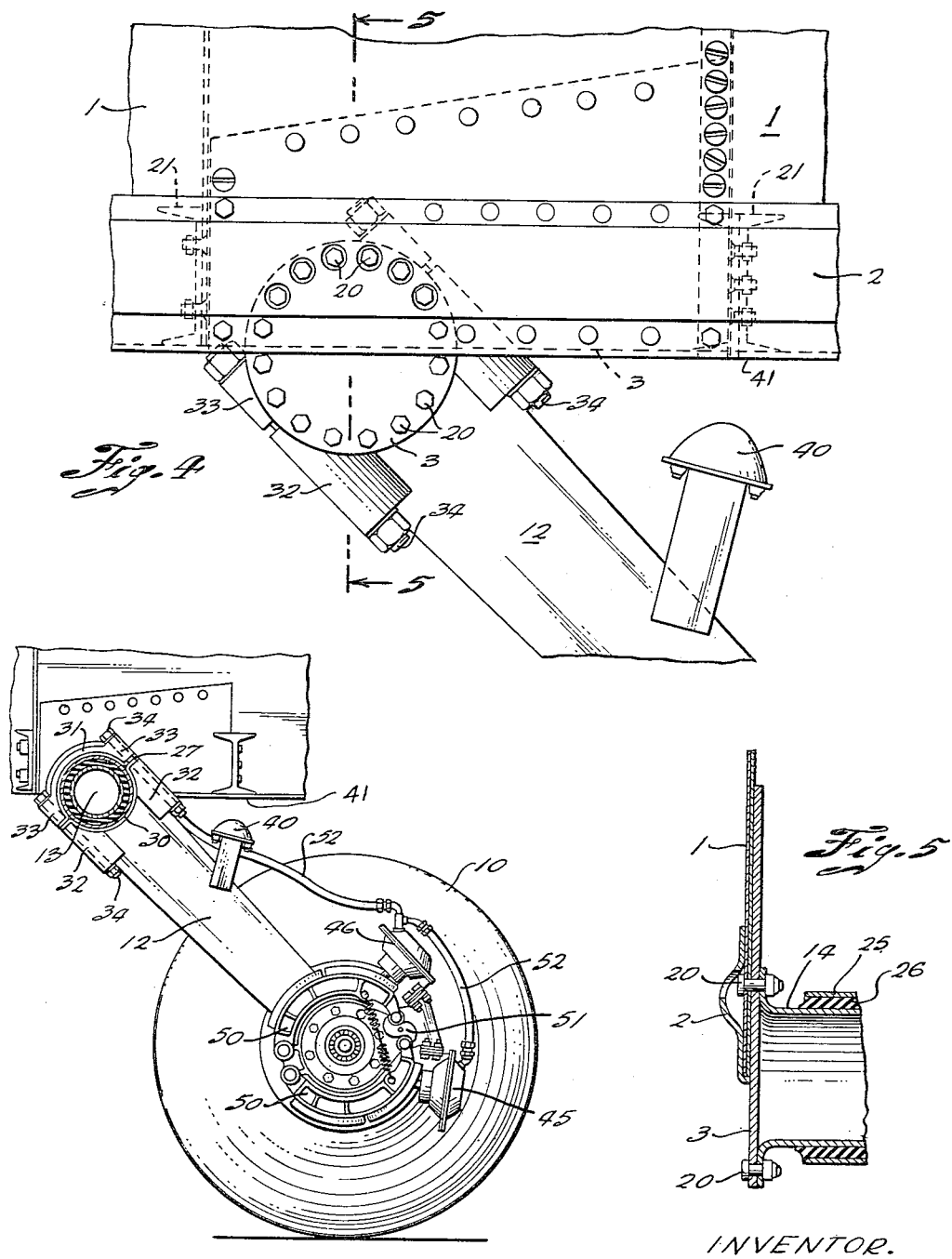

United States Patent Office 2,773,699
Patented Dec. 11, 1956

2,773,699

TRAILER REAR WHEEL TORSION SPRING SUSPENSION

Leroy Grumman, Plandome Manor, N. Y., assignor to Grumman Aircraft Engineering Corporation, Bethpage, N. Y., a corporation of New York Application January 17, 1949, Serial No. 71,359

2 Claims. (Cl. 280—124)

This invention relates to improvements in trailer rear wheel suspensions.

In tractor-trailer combinations, the front end of the trailer is ordinarily supported by the tractor, while the rear end is supported by two or more sets of double wheels. Coil spring combinations of various types are ordinarily used for the trailer wheel suspensions, involving considerable complexity in mechanical parts and liability to failure. Also, independent braking of the components of the double wheel is ordinarily not possible and the removal and replacement of the inner tire of a double wheel combination requires the removal of the outer wheel as well. Many types of rear wheel suspension also require so much space as to raise the center of gravity of the trailer unduly or to consume otherwise useful space in providing internal wells and the like for accommodating the rear wheel assembly. The majority of the foregoing defects arise from the application to the undriven and unsteered rear wheels of a trailer of spring and supporting structures developed primarily for use in driven and steered wheel assemblies for various types of vehicles. The present invention, however, provides a rear wheel suspension especially adapted to trailers, with the general object of eliminating the difficulties just mentioned.

With this and still other objects which will appear in the following description in mind, the invention consists in the combinations and arrangements of parts and details of construction which will now first be fully described with reference to the accompanying drawing, and will then be more particularly pointed out in the appended claims.

In the drawing:

Figure 1 is a largely schematic side elevation of a tractor-trailer combination embodying the invention in a preferred form of embodiment;

Figure 2 is a detail view, partly in rear elevation and partly in central longitudinal section, of a spring assembly used in the wheel suspension above mentioned;

Figure 3 is a rear elevation of the rear wheel suspension, showing in phantom certain trailer components to which it is attached;

Figure 4 is a detail side view looking in the direction of the arrow 4 of Figure 3 and showing the attachment of the rear wheel suspension to the trailer body;

Figure 5 is a detail section on the line 5—5 of Figure 4; and

Figure 6 is a section on the line 6—6 of Figure 3.

The tractor-trailer unit shown schematically in side elevation in Figure 1 of the drawings is generally of conventional type. The trailer A is pivotally supported at its front end by the tractor B and is supported at its rear end by the rear wheel assembly indicated generally by the letter C. The type of trailer shown is one in which the side walls are composed of relatively heavy panels 1, reinforced and protected by a bumper rail 2 and the rear wheel assembly is fastened to the elements 1, as indicated in Figures 3 to 6, by means of a reinforcing plate 3, the specific means of attachment being described in detail below. However, as will be apparent, the trailer A may be of any desired construction and convenient arrangements for mounting the rear wheel assembly C on trailers of varying structures and design will be apparent to those skilled in the art.

In the embodiment illustrated, the rear wheel assembly comprises a pair of double wheel units which are generally identical, except for being right and left hand. Each unit comprises an inner wheel 10 and an outer wheel 11, mounted by means of suitable stub shafts and anti-friction bearings on either side of a supporting arm 12, which in turn is pivotally and resiliently supported for movement around a transverse axis 13. The supporting structure for the arms 12 includes an inner tubular member formed of components 14 having flanges 15, by means of which they are bolted to the side panels 1 and reinforcing members 3, as before indicated. In Figure 4 there is shown a side panel 1 and reinforcing plate 3, indicated in dotted lines, together with bolts 20 attaching the flanges 15 thereto. Transverse girders or structural members 21 of the trailer body are also indicated. While the tubular elements 14 can be fastened to the trailer in any convenient manner, it will be apparent that the fastening means and location thereof with respect to the trailer A as shown and described will be sturdy and satisfactory.

The tubular elements 14 are held in alignment by a sleeve 22 (Figure 2) fastened to one of them by means of a bolt 23 to prevent slipping of the sleeve along the elements 14.

Each tubular element 14 forms the innermost component of a torsion spring which includes also an outer tubular shell 25 and an annular resilient body or shell 26, of rubber or the like elastic material, such as any of a variety of synthetic rubbers, interposed between the inner and outer shells 14 and 25. The outer shell 25 is formed as a split shell joined together by means of flanges 27 and bolts 28. Each inner shell 14, together with its outer shell 25 and intermediate layer of rubber 26, forms a torsion spring unit in which the rubber 26 fills the annular space between the inner and outer shells completely and densely and is vulcanized or otherwise bonded to both the inner and outer components so as to join the same together.

Each arm 12 comprises a cylindrical seat 30 and a cap 31 cooperating therewith. Enlargements 32 abut against the flanges 27 of the torsion spring outer shell and similar enlargements 33 of the cap abut against the opposing flanges, the whole assembly being fastened together by means of bolts, as indicated in Figures 3, 4 and 5.

The construction is built so that twisting of the outer shell 25 or inner shell 14 is negligible by comparison with the relative rotation of these members, so that torque exerted between the inner component 14 and the outer component 25 is distributed substantially uniformly throughout the rubber 26 along the length of outer shell 25.

Since lateral flow of the rubber 26 is possible only at the ends of shell 25, and the length of this shell is large by comparison with the thickness of the rubber 26, there will be no substantial lateral flow and shell 25 will remain to all intents and purposes concentric or coaxial with the inner component 14, even under full load.

In a typical assembly, the outer shell 25 may be about four feet long and about seven inches in inside diameter, and the rubber about one-half inch thick. The arm 12 may be at an angle of about 45° to the horizontal under conditions of no load and about 38° under full load conditions. A bumper 40 carried by the arm 12 engages a stop 41 under conditions of extreme stress such as may be encountered when going over a sharp bump at high speed. In this position, the torsion spring assembly may be turned through approximately double the normal angle, so that the angle of the arm 12 to the horizontal may be about 30°.

The torque characteristic of the shell 25 is substantially linear. The moment arm of the wheel suspension about the axis 13, however, varies with the change of angle so that the change of angle of the arm 12 for unit change in load will vary with the cosine of the angle between the arm 12 and the horizontal. This effect is not significant in the operation of the device.

Each of the wheels 10 and 11 is carried on a stub shaft and roller bearing on the arm 12 and is provided with a brake drum of conventional type. A hydraulic actuator 45 operates the brake for the wheel 11 and a hydraulic actuator 46 operates the brake for the wheel 10. Figure 6 shows one of the arms 12 and associated mechanism with the wheel 11 and its brake drum removed, thus exposing the brake 50, and cam mechanism 51 by means of which the actuator 45 operates to supply braking force to the wheel 11. The braking arrangement of the companion wheel 10 is the same and the two actuators are connected to a common hydraulic line 52 for simultaneous operation. Provision of a separate brake for each wheel permits very effective braking, while using brake drums and brakes of reasonable dimensions.

To prevent jackknifing, it is usual to apply trailer brakes slightly in advance of the tractor brakes, when slowing down the combination. The tendency of the center of gravity to continue to move creates a couple tending to cause the trailer to pitch forward, increasing the percentage of trailer load borne by the tractor as compared with that borne by the trailer rear wheel suspension. The effect of applying the brakes in the present construction is somewhat different. Referring to Figure 6, and assuming the vehicle to be moving to the left, as will be the case, and assuming further that the brakes are now applied, it will be apparent that the brake drums of the wheels will exert a counter-clockwise couple on the brakes around the axis of rotation of the wheels and thus also around the axis 13 of the torsion spring assembly. The effect of such a couple on the torsion spring is the same as an increase in load and the tendency is thus to lift the rear wheel assemblage upwardly with reference to the trailer body and, therefore, to cause the latter to squat or move downwardly. This tendency, being opposite to the normal pitching movement, reduces pitching and oscillation of the trailer.

What is claimed is:

1. In a trailer wheel suspension and in combination, a torque spring comprising an inner member attached at each end to the trailer and extending horizontally and transversely thereof, an outer member for each side of the trailer surrounded and supported by the inner member and rubber or the like elastic material between the two outer members and inner member bonded to and joining the same together, an arm for each side of the trailer, means attaching a said arm at one end to each said outer member for pivoting movement therewith about the inner member, and wheel mountings attached to the other end of each said arm and on each side thereof for carrying a pair of wheels, the inner member comprising two tubular elements, one within each of the said outer members and held in alignment by a sleeve within their adjacent ends.

2. A trailer wheel suspension according to claim 1, in which the said tubular elements are formed with flanges for attaching them to the trailer.

References Cited in the file of this patent

UNITED STATES PATENTS

| | | |
|---|---|---|
| 1,932,445 | Burns | Oct. 31, 1933 |
| 1,964,735 | Knox et al. | July 3, 1934 |
| 1,993,260 | Burns | Mar. 5, 1935 |
| 2,403,362 | Hait | July 2, 1946 |
| 2,459,372 | Fraunfelder | Jan. 18, 1949 |
| 2,555,649 | Krotz | June 5, 1951 |

FOREIGN PATENTS

| | | |
|---|---|---|
| 646,964 | Germany | June 24, 1937 |
| 485,077 | Great Britain | May 13, 1938 |